July 27, 1943.  P. W. EATON  2,325,568
TRUCK
Filed March 28, 1940  3 Sheets-Sheet 1

INVENTOR.
Philip W. Eaton
BY
Arthur F. Randall, atty.

July 27, 1943.  P. W. EATON  2,325,568
TRUCK
Filed March 28, 1940  3 Sheets-Sheet 2
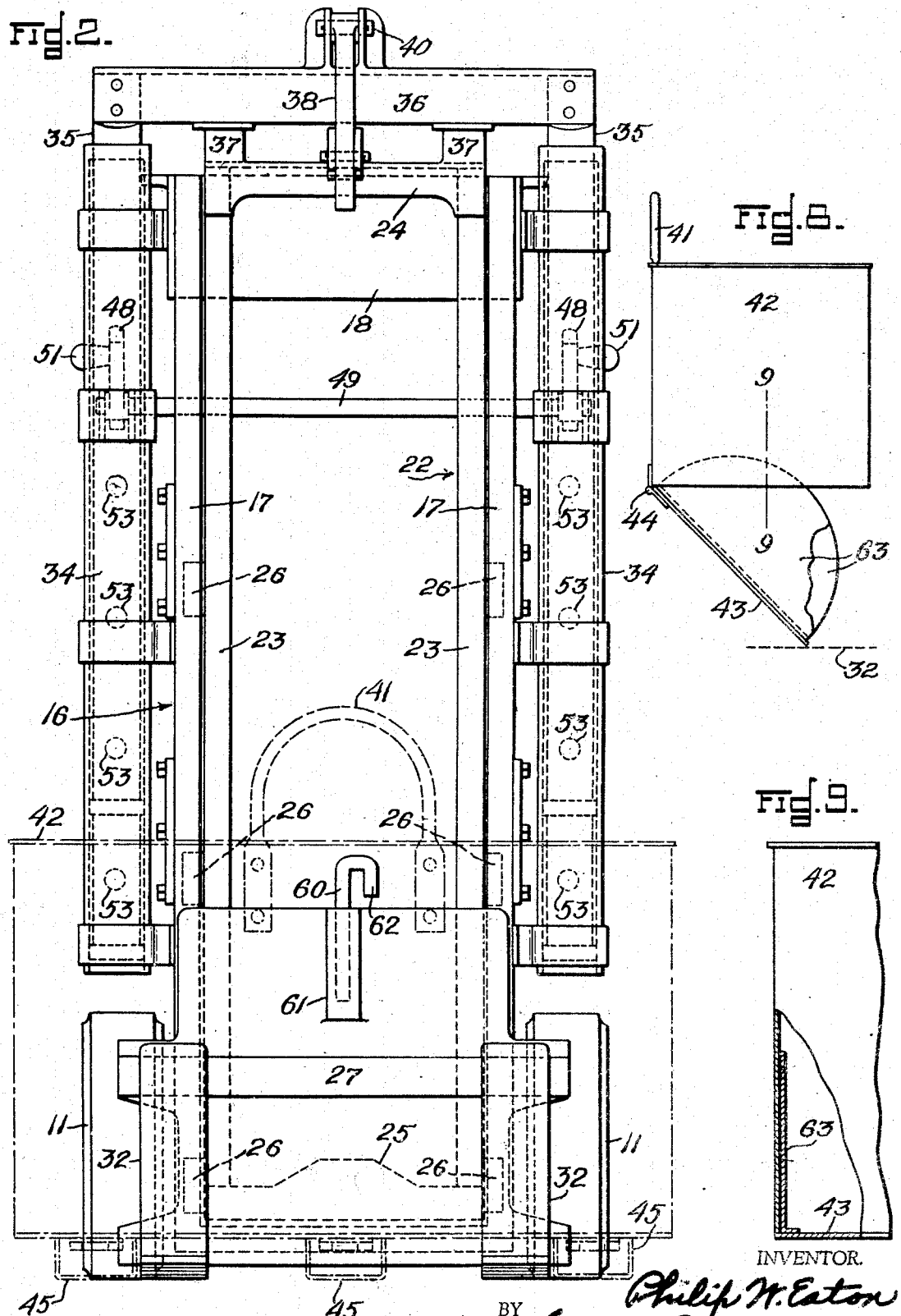
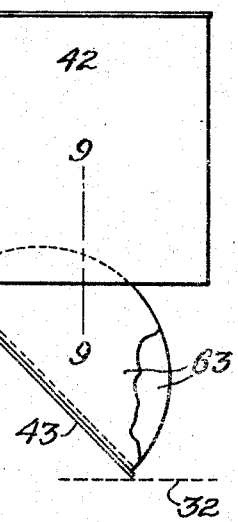
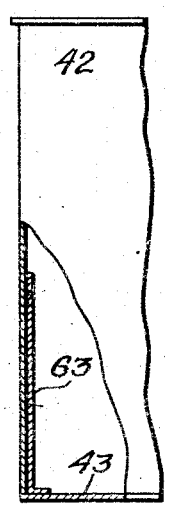
INVENTOR.
Philip W. Eaton
BY Arthur F. Randall, atty.

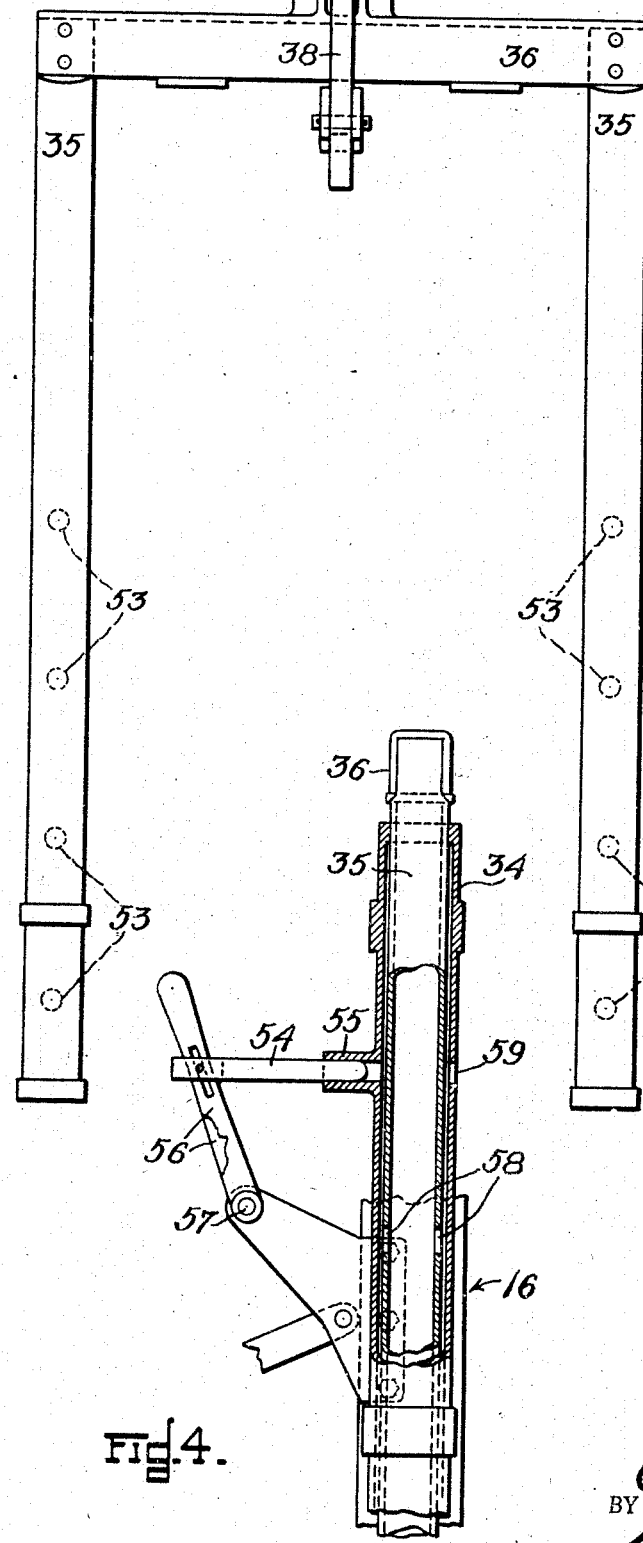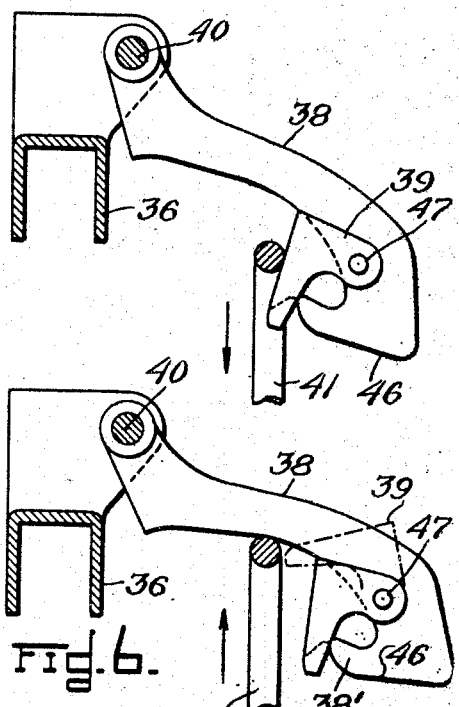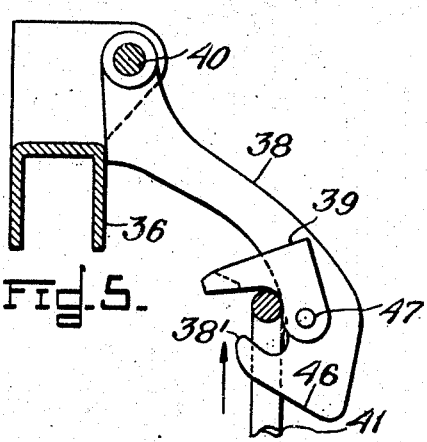

Patented July 27, 1943

2,325,568

UNITED STATES PATENT OFFICE 2,325,568

TRUCK

Philip W. Eaton, Boston, Mass., assignor, by direct and mesne assignments, of seven-tenths to Thomas A. Cotter, Boston, and three-tenths to Charlotte E. Wilson, Brookline, Mass.

Application March 28, 1940, Serial No. 326,442

11 Claims. (Cl. 214—113)

This invention relates to self-propelled trucks, such as are employed in warehouses, shops and other places for moving about and handling heavy material and objects, and has particular reference to trucks of this class adapted to handle dumping buckets. The invention also contemplates improvements in the dumping mechanisms of trucks of this class as well as improvements in the buckets employed in connection therewith.

The invention has for its object to provide an improved truck of the class indicated which will be particularly constructed so that it can be operated to pick up, transport and dump loaded buckets.

To this end I have provided an improved motor propelled and operated truck of the character described having the features of construction and mode of operation set forth in the following description, the several novel features of the invention being separately pointed out and defined in the claims at the close of the description.

In the accompanying drawings—

Figure 2 is a front elevation of the machine shown in Fig. 1.

Figure 3 is an elevation of the yoke or carrier on which the grappling hook, hereinafter described, is mounted.

Figure 4 illustrates a modification of the yoke locking mechanism.

Figures 5, 6 and 7 illustrate the operation of the hook member hereinafter described.

Figure 8 is an end view of the bucket in load-discharging condition.

Figure 9 is a partial section on line 9—9 of Fig. 8, but with the bottom wall of the bucket in its closed position.

Figure 1:
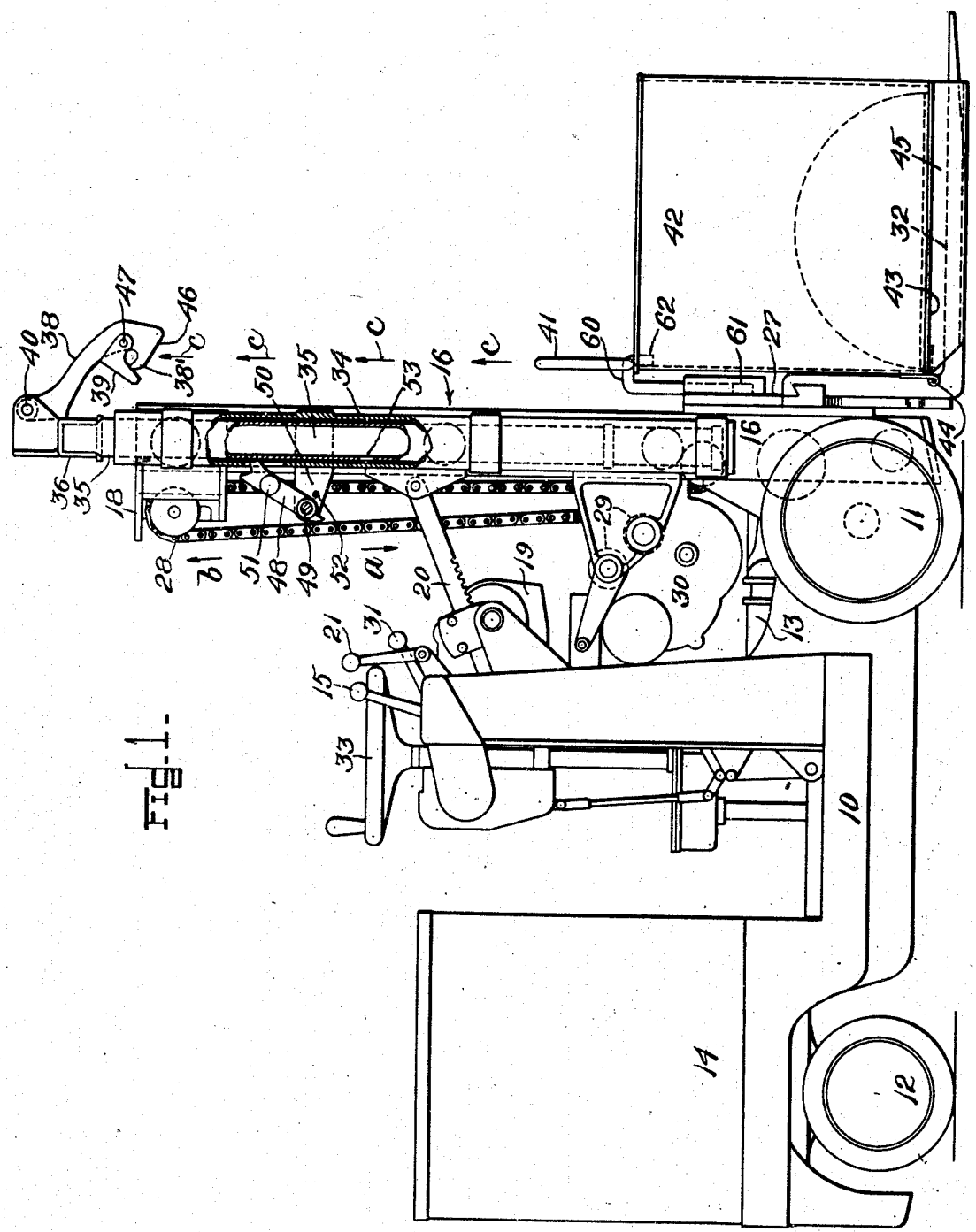
Figure 1 is a side elevation of a motor propelled truck equipped with bucket handling mechanism constructed in accordance with this invention.

The truck illustrated in the accompanying drawings comprises a chassis 10 supported by a pair of front wheels, one of which is shown at 11, and a pair of dirigible rear wheels, one of which is shown at 12, the front wheels being driven by an electric motor 13 which is controlled by the operator who stands upon the chassis 10 immediately in front of the usual battery compartment 14. One of the controllers through which the operator starts, stops and reverses driving motor 13 is shown at 15.

At the front of chassis 10 is pivotally supported an upstanding rectangular frame 16 including two spaced apart relatively parallel side channels 17 which are disposed with their flanges innermost, the upper ends of said channels being rigidly connected by a head or cross bar 18. The lower ends of the channels 17 are pivotally connected with the chassis so that the frame 16 can be swung fore and aft on a transverse axis by means of an electrically driven tilting unit 19 that is connected with frame 16 by rack bars 20 and which is controlled by the operator through the medium of a control member 21.

Between the channels 17 of frame 16 is arranged a supplemental frame 22 (Fig. 2) comprising oppositely disposed side channels 23 connected at their upper ends by a cross bar 24 and at their lower ends by a cross bar 25. The channels 23 of this supplemental frame are provided upon their outer sides with rollers 26 occupying positions between the flanges of the channels 17 of the main frame 16 so that the inner supplemental frame 22 can be moved up and down relatively to the outer main frame and so that it is guided in its movement by the rollers.

Slidably mounted upon the front side of the inner supplemental frame 22 is a load-supporting carriage or fork 27 to which the opposite ends of a chain 28 (Fig. 1) are connected as usual so that when said chain is operated in one direction carriage 27 is moved upwardly relatively to the inner supplemental frame 22 and when said chain is moved in the opposite direction the carriage is lowered.

The chain 28 extends around the usual sprockets, two of which are carried by the inner supplemental frame 22 and the others by the outer main frame 16. The last mentioned sprockets include two driving sprockets 29 forming part of an electrically operated hoist unit 30 which is controlled by the operator through the medium of a handle or control member 31.

The carriage 27 is equipped with a pair of angular tines 32 which are mounted on the carriage 27 with provision for adjustment toward and from each other as may be required for the particular load to be carried. The carriage 27 with its tines 32 is usually referred to as the fork of the machine and, as shown in Fig. 1, each tine is made with a forwardly extending portion that is adapted to be slid or moved into position beneath the load that is to be carried, through forward movement of the vehicle or truck.

While the truck is traveling from one point to another the operator directs its course by means of a steering wheel 33 connected through the usual mechanism with the rear dirigible wheels 12.

When the carriage 27 occupies its lowermost position as shown in Fig. 1, and movement of chain 28 is occasioned in the direction of the arrow a, the said carriage 27 is moved upwardly relatively to main frame 16 and the inner supplemental frame 22 until carriage 27 reaches and engages abutments on the upper end of supplemental frame 22 after which continued movement of chain 28 in the direction of arrow a raises both supplemental frame 22 and carriage 27 in unison. In other words, the framework of the hoisting apparatus is extensible and is extended after carriage 27 arrives at the top of supplemental frame 22 if the movement of chain 28 is continued.

When chain 28 is operated in the direction indicated by the arrow b (Fig. 1) after the hoisting apparatus has been extended, carriage 27 and supplemental frame 22 are lowered in unison until the supplemental frame is arrested by the usual down stops therefor, after which continued movement of the chain slides the carriage 27 downwardly on supplemental frame 22 until it arrives at its lowermost position shown in Fig. 1.

The above details of construction and operation are as heretofore and my present invention contemplates improving the hoisting apparatus or mechanism in order to adapt the same to handle and operate dumping buckets or the like.

To this end I provide a longitudinally disposed tubular guide 34 upon the outer side of each channel 17 of main frame 16 and within each guide 34 there is provided a tubular slide 35. The slides 35 extend above the tops of the tubular guides 34 and are rigidly connected by a cross bar or head 36 which rests upon upstanding bosses 37 forming part of cross bar 24 of supplemental frame 22. The tubular members 35, together with the cross bar or head 36, constitute a yoke or carrier for a grappling hook 38 on which is pivotally mounted a cam shield 39. The grappling hook 38 is loosely and pivotally connected with cross head 36 at 40 and normally it rests by gravity against the side of cross head 36 which supports it in its normal operative position.

Hook member 38 is particularly constructed to cooperate with the bail 41 of a bucket 42 whose bottom wall 43 is pivotally connected at 44 with the body portion of the bucket so that it can be opened and closed.

Bolsters 45 provided upon the bottom side of the bottom wall 43 support the latter above the level of the ground so that the tines 32 of the fork can be moved into and out of position beneath the bottom wall 43 while the bucket rests upon the ground.

After the vehicle has been manipulated to position the tines 32 of the fork beneath a loaded bucket the chain 28 is operated to raise the fork far enough to lift the loaded bucket away from the ground and then the vehicle is operated to transport the bucket to its destination. The chain 28 is then again operated in the direction of the arrow a to raise the bucket. If the height at which the bucket is to be dumped does not require extension of the hoist frame, then the carriage or fork 27 with the bucket on it will be lifted to the upper end of supplemental frame 22 and stopped at that point. During the upward movement of the bucket the bail 41 traverses the path indicated by the upwardly pointed arrows c in Fig. 1, and through engagement with a cam surface 46 (Figs. 5, 6 and 7) provided at the free end of hook 38 it swings the latter laterally and upwardly until the bail rides off of cam 46 and swings cam shield 39 upwardly whereupon the hook 38 falls by gravity into position against the bail 41 (Fig. 5) with the cam shield 39 resting on top of the bail and when the parts occupy these positions further upward movement of the carriage 27 is stopped by the operator. The operator then operates chain 28 in the direction indicated by the arrow b which lowers carriage 27 and the bucket moves down with the latter until the hook 38' stops its downward movement. After this, as carriage 27 continues to descend, the body portion of the bucket is held stationary by the engagement of the hook with the bail while the pivoted bottom 43 swings downwardly (Fig. 8) under the influence of the load within the bucket and said load is discharged from the latter as will be clear.

In order to free the bucket from hook 38' and lower said bucket the operator causes the chain 28 to move in the direction of the arrow a thereby raising the bucket relatively to hook 38 and cam shield 39 until the bail 41 passes the latter (Fig. 6) whereupon said shield falls by gravity into position against the nose of the hook. The operator then stops further upward movement of the bucket and causes chain 28 to be driven in the direction indicated by the arrow b to lower the bucket. As the bucket moves downwardly (Fig. 7) the bail 41 rides against the cam shield 39 thereby swinging hook member 38 aside and permitting the bucket to descend with carriage 27 without interference with the hook.

If the bucket is to be dumped at such a height as to require extension of the hoist frame, the movement of chain 28 in the direction of the arrow a is continued after carriage 27 reaches the upper end of supplemental frame 22 which results in upward movement of said supplemental frame with said carriage and since the cross bar or head 36 is normally supported by the supplemental frame the hook-carrying yoke 35—36 will also move upwardly with the supplemental frame 22 and carriage 27. When the chain 28 is stopped with the hoist frame thus extended the hook-carrying yoke 35—36 is locked in its elevated position. At this moment hook member 38 is supported by the bail of the bucket in a position where it is upwardly displaced relatively to yoke 35—36 with cam shield 39 hanging freely on its pivot 47 clear of bail 41. Therefore, preparatory to dumping the bucket it is necessary to first lower the bail 41 to a position below hook 38' to permit the latter to assume the position shown in Fig. 1; then to raise bail 41 into a position just above the nose of hook 38 where it supports the cam shield 39 (Fig. 5) in a relatively elevated position, and then to lower bail 41 until it is caught by the hook after which continued downward movement of carriage 27 permits the bottom wall 43 to swing open and the contents of the bucket to discharge.

In Figs. 1 and 2 of the drawings means is provided for automatically locking the yoke 35—36 in its elevated position when the hoist frame is thus extended and said means, as herein shown, includes two gravity latches 48, each of which rests by gravity against the side of one of the slide members 35. These latches are both fixed to a horizontal transversely disposed shaft 49 rotatably supported by brackets 50 projecting from tubular guides 34 and each is provided with a laterally extending handle 51 by means of which both latches can be simultaneously swung into and out of operative position. Swinging movement of the latches toward inoperative position being limited by a stop 52 (Fig. 1).

Each tubular leg or member 35 of the yoke 35—36 is formed with a series of holes 53 arranged in a longitudinal row and disposed so as to cooperate with the latches 48. As the yoke 35—36 is moved upwardly with the supplemental frame 22 the holes 53 of each member or arm 35 of the yoke are successively brought to register with the nose or free end of its latch 48 so that said nose drops into each hole as it passes. It will, therefore, be clear that by raising the yoke into a position just above the desired dumping position and then lowering said yoke a short distance the latches 48 will each drop into one of the holes 53 thereby automatically locking the yoke in its elevated position. That is to say, the upper side of each hole 53 provides a downwardly facing abutment shoulder on its member or leg 35 which is engaged automatically by its latch 48 to lock said leg or member in its elevated position preparatory to dumping the bucket.

When, after dumping the bucket, the latter is raised relatively to the hook to disengage the bail 41 from said hook, the supplemental frame 22 is caused to move upwardly far enough to raise the yoke 35—36 slightly thereby permitting the operator to swing the latches outwardly into their inoperative position where they are held by gravity until they are to be used again.

In Fig. 4 I have shown a modified form of yoke-locking mechanism which includes a bolt 54 for each member 35, said bolt being slidably mounted in a bearing 55 provided on the adjacent tubular guide 34. The outer end of each bolt 54 is connected through a pin-and-slot connection with a lever 56 and both levers are fast on a transverse shaft 57 journaled in brackets projecting from the main frame 16. In this case each leg or slide member 35 of the hook-carrying yoke is made with two longitudinal rows of holes 58 and the holes of one row are disposed diametrically opposite the holes of the other row. It will be clear that when a pair of holes 58 are in axial alinement with each bolt 54 the latter can be moved endwise through said holes 58, and also through a hole 59 formed in tubular guide 34 opposite bearing 55, to lock the yoke in its uppermost position.

The cam shield 39 is in the form of a yoke whose legs are disposed upon opposite sides of, and pivotally connected at 47 with, the hook member 38 while the intermediate portion of the yoke is adapted to rest upon the nose of the hook 38' while the shield occupies its normal position and to abut the shank portion of member 38 when said shield occupies a position at the limit of its upward swinging movement relatively to said member. Thus, when the bail 41 is to be disengaged from hook 38' after dumping the bucket, the carriage 27 is caused to move upwardly so that at first the bail raises shield 39 into position against the shank of member 38 and thereafter acts through said shield to swing member 38 upwardly and outwardly until the lateral swinging movement of member 38 carries the shield 39 out of engagement with the bail (Fig. 6) whereupon the shield falls by gravity into position against the nose of the hook. It will be clear that as soon as the shield falls in to this position the carriage 27 can be moved downwardly (Fig. 7) thereby lowering member 38 until the bail 41 engages the shield. Continued downward movement of carriage 27 causes the bail to ride downwardly on the exposed cam side of shield 39 thereby swinging member 38 outwardly to some extent until the bail clears the lower end of shield 39 whereupon member 38 returns by gravity to its normal position where it is supported by the cross bar or head 36.

While I prefer the dumping member or hook 38, constructed and operating as described, it will be clear that other types of hooks may be substituted, if desired.

While transporting the bucket to its destination over rough ground there is a tendency for the bucket to be displaced on the fork both laterally and fore and aft. Lateral displacement may be prevented by the bolsters 45 which occupy positions alongside of the tines of the fork. In order to prevent accidental displacement of the bucket fore and aft on the fork the present invention contemplates the provision of means for preventing such displacement. As herein shown, this means comprises a hook-shaped locking member or bolt 60 whose shank portion is loosely mounted within a socket 61 provided upon the front side of carriage 27 at the top thereof. The nose 62 (Figs. 1 and 2) is relatively short and directed downwardly while the shank portion of this locking member is movable endwise and rotatively within the socket 61. When the vehicle is manipulated to position the tines of the fork beneath a loaded bucket the hook bolt 60 is manually slid upwardly from the position shown in Fig. 2, turned ninety degrees forwardly and then lowered so that the top of the hook rests on the chime of the bucket with the nose 62 within the latter. Thus the bucket, while being transported to and from the destination of its load, is securely held by hook bolt 60 against sliding forward on the tines 32 of the fork. In other words, the bucket is positively locked in position on the work while it is in transit. It will be clear that the empty bucket is removed by raising hook bolt 60 and turning the same rearwardly ninety degrees.

It is desirable, when dumping the contents of the bucket, that all of said contents be directed in one direction and to accomplish this the bottom wall 43 of the bucket is made at its opposite ends with upstanding or perpendicular end walls 63 (Figs. 8 and 9) which give to said bottom wall a trough-like shape so that when the bucket is dumped, as in Fig. 8, all of its contents is directed in one direction, viz., forwardly. These end walls 63 are seated upon, and welded to, the top side of the bottom wall 43 of the bucket and each occupies a position alongside of, and close to, the adjacent end wall of the bucket body, preferably within said bucket so as to be supported by said end wall.

What I claim is:

1. An automotive truck comprising bucket hoisting and dumping apparatus including, in combination, a main frame disposed at one end of the vehicle and extending upwardly therefrom; a supplemental frame mounted on said main frame for movement up and down relatively thereto; a carriage movable up and down on said supplemental frame and providing a seat for a bucket; power operated mechanism operable to move said carriage upwardly on said supplemental frame to the upper end of the latter and to thereafter move said carriage and supplemental frame together upwardly relatively to said main frame; a bucket seated on said carriage made with a bail and having a bottom wall hingedly connected with the body of said bucket, said bottom wall being supported in closed position by said seat; a pendant bucket-dumping hook member; a support on which said dumping member is pivotally supported adjacent to the upper end of said supplemental frame and in the path of said bail, said support being slidably associated with said main frame and in abutting engagement with said supplemental frame so as to move upwardly with the latter, and mechanism for locking said support in its elevated position while said carriage and said bucket are being raised and lowered to engage said bail with said hook member and to dump the contents of said bucket.

2. An automotive truck comprising bucket hoisting and dumping apparatus constructed in accordance with claim 1 wherein said last mentioned mechanism of claim 1 is automatically operable to lock said support in its elevated position and is manually operable to free said support preparatory to lowering the same with said supplemental frame.

3. An automotive truck comprising bucket hoisting and dumping apparatus including, in combination, a main frame disposed at one end of the vehicle and extending upwardly therefrom; a supplemental frame mounted on said main frame for movement up and down relatively thereto; a carriage movable up and down on said supplemental frame and providing a seat for a bucket; power operated mechanism operable to move said carriage upwardly on said supplemental frame to the upper end of the latter and to thereafter move said carriage and supplemental frame together upwardly relatively to said main frame; a bucket seated on said carriage made with a bail and having a bottom wall hingedly connected with the body of said bucket, said bottom wall being supported in closed position by said seat; a pendant bucket-dumping hook member; a support on which said dumping member is pivotally supported adjacent to the upper end of said supplemental frame and in the path of said bail, said support being slidably associated with said main frame and in abutting engagement with said supplemental frame so as to move upwardly with the latter, and mechanism for locking said support in its elevated position while said supplemental frame, said carriage and said bucket are being raised and lowered to engage said bail with said hook member and to dump the contents of said bucket.

4. An automotive truck comprising bucket hoisting and dumping apparatus including, in combination, a main frame disposed at one end of the vehicle and extending upwardly therefrom; a supplemental frame mounted on said main frame for movement up and down relatively thereto; a carriage movable up and down on said supplemental frame and providing a seat for a bucket; power operated mechanism operable to move said carriage upwardly on said supplemental frame to the upper end of the latter and to thereafter move said carriage and supplemental frame together upwardly relatively to said main frame; a bucket seated on said carriage made with a bail and having a bottom wall hingedly connected with the body of said bucket, said bottom wall being supported in closed position by said seat; a pendant bucket-dumping hook member pivotally supported adjacent to the upper end of said supplemental frame whose lower end is made with a hook disposed in the path of said bail so that upward movement of the latter against said lower end serves to deflect said lower end sidewise in one direction out of the path of said bail thereby to permit said bail to pass said hook and to cause said lower end to swing by gravity in the opposite direction after said bail has passed the hook so that the latter engages said bail to hold the body of the bucket stationary when the carriage is thereafter lowered to dump the contents of the bucket; a support on which said dumping member is pivotally mounted at its upper end, said support being slidably associated with said main frame and normally in abutting engagement with said supplemental frame so as to move upwardly with the latter, and mechanism carried by said main frame for locking said support in its elevated position while said carriage and said bucket are being raised and lowered to engage said bail with said hook member and to dump the contents of said bucket.

5. An automotive truck comprising bucket hoisting and dumping apparatus including, in combination, a main frame disposed at one end of the vehicle and extending upwardly therefrom; a supplemental frame mounted on said main frame for movement up and down relatively thereto; a carriage movable up and down on said supplemental frame and providing a seat for a bucket; power operated mechanism operable to move said carriage upwardly on said supplemental frame to the upper end of the latter and to thereafter move said carriage and supplemental frame together upwardly relatively to said main frame; a bucket seated on said carriage made with a bail and having a bottom wall hingedly connected with the body of said bucket, said bottom wall being supported in closed position by said seat; a pendant bucket-dumping hook member; a support for said dumping member including two tubular slide members disposed at opposite sides of said main frame and each telescopically mounted within a tubular guide forming part of said main frame and disposed parallel with the direction of movement of said supplemental frame and a cross bar connecting the upper ends of said tubular slide members with which the upper end of said dumping member is pivotally connected, said cross bar having abutting engagement with said supplemental frame so as to move upwardly with the latter, and mechanism carried by said main frame for locking said support in its elevated position while said carriage and said bucket are being raised and lowered to engage said bail with said hook member and to dump the contents of said bucket.

6. An automotive truck comprising bucket hoisting and dumping apparatus constructed in accordance with claim 5 and wherein said last mentioned locking mechanism of claim 5 is automatically operable to lock said support in its elevated position and is manually operable to free said support preparatory to lowering the same with said supplemental frame.

7. An automotive truck comprising bucket hoisting and dumping apparatus including, in combination, a main frame disposed at one end of the vehicle and extending upwardly therefrom; a supplemental frame mounted on said main frame for movement up and down relatively thereto; a carriage movable up and down on said supplemental frame and providing a seat for a bucket; power operated mechanism operable to move said carriage upwardly on said supplemental frame to the upper end of the latter and to thereafter move said carriage and supplemental frame together upwardly relatively to said main frame; a bucket seated on said carriage having a bottom wall hingedly connected with the body of said bucket, said bottom wall being supported in closed position by said seat; a bucket-dumping member movable upwardly with said supplemental frame and movably supported by the latter while the latter occupies an elevated position, said member occupying a position in the path of the upward movement of said bucket so as to separably engage and support the latter when said carriage is lowered to dump the contents of the bucket, and means for locking said member in its elevated position when said carriage is lowered to dump the contents of the bucket.

8. An automotive truck comprising bucket hoisting and dumping apparatus including, in combination, a frame disposed at one end of the vehicle and extending upwardly therefrom; a carriage movable up and down on said frame and providing a seat for a bucket; mechanism for moving said carriage up and down on said frame; a bucket seated on said carriage made with a bail, and a pendant bucket-dumping member pivotally supported adjacent to the upper end of said frame, the lower end of said member being made with a hook disposed in the path of said bail and provided with a cam shield for said hook that is adjustably mounted on said member and normally held by gravity in position to close the entrance to said hook, but which is adapted to be shifted into hook-uncovering position by said bail when the latter is moved upwardly to a predetermined height thereby to permit said hook to automatically fall into position beneath said bail so as to hold the latter against downward movement with the carriage while the contents of said bucket is being dumped, and which is adapted to be moved automatically by gravity into position to close the entrance to said hook when said bail is moved upwardly beyond said predetermined height so as to prevent engagement of the hook with the bail when the latter is thereafter lowered.

9. In a transporting and dumping device for industrial trucks having a frame, an extension frame thereon, forks reciprocally mounted on said extension frame, a second extension frame elevated by said first named extension frame, tubular members mounted on said first named frame for guiding the movement of said second named extension frame, manually operable means mounted on said tubular members for locking said second named extension frame in elevated position including locking members passing through said tubular members and into supporting relationship with said second named extension frame, said forks being adapted to support a container to be elevated by said forks, and means mounted on said second named extension frame to engage said container when elevated to dumping position by said forks.

10. In a transporting and dumping device for industrial trucks having a frame, an extension frame thereon, forks reciprocally mounted on said extension frame, a second extension frame elevated by said first named extension frame, guide means mounted on said first named frame for guiding the movement of said second named extension frame, manually operable means mounted on said guide means for locking said second named extension frame in elevated position including locking means engageable with means on said second named extension frame, said forks being adapted to support a container to be elevated by said forks, and means mounted on said second named extension frame for restraining said container when said container is to be dumped.

11. An automotive truck comprising bucket hoisting and dumping apparatus including, in combination, a frame disposed at one end of the vehicle and extending upwardly therefrom; a carriage movable up and down on said frame and providing a seat for a bucket; mechanism for moving said carriage up and down on said frame; a bucket seated on said carriage, and a pendant bucket-dumping member pivotally supported adjacent to the upper end of said frame, the lower end of said member being made with a hook disposed in the path of said bucket and provided with a cam shield for said hook that is adjustably mounted on said member and normally held by gravity in position to close the entrance to said hook but which is adapted to be shifted into hook-uncovering position by said bucket when the latter is moved upwardly to a predetermined height thereby to permit said hook to automatically fall into bucket-engaging position so as to hold said bucket against downward movement with the carriage while the contents of said bucket is being dumped, and which is adapted to be moved automatically by gravity into position to close the entrance to said hook when said bucket is moved upwardly beyond said predetermined height so as to prevent engagement of the hook with the bucket when the latter is thereafter lowered.

PHILIP W. EATON.